United States Patent Office 2,856,060
Patented Oct. 14, 1958

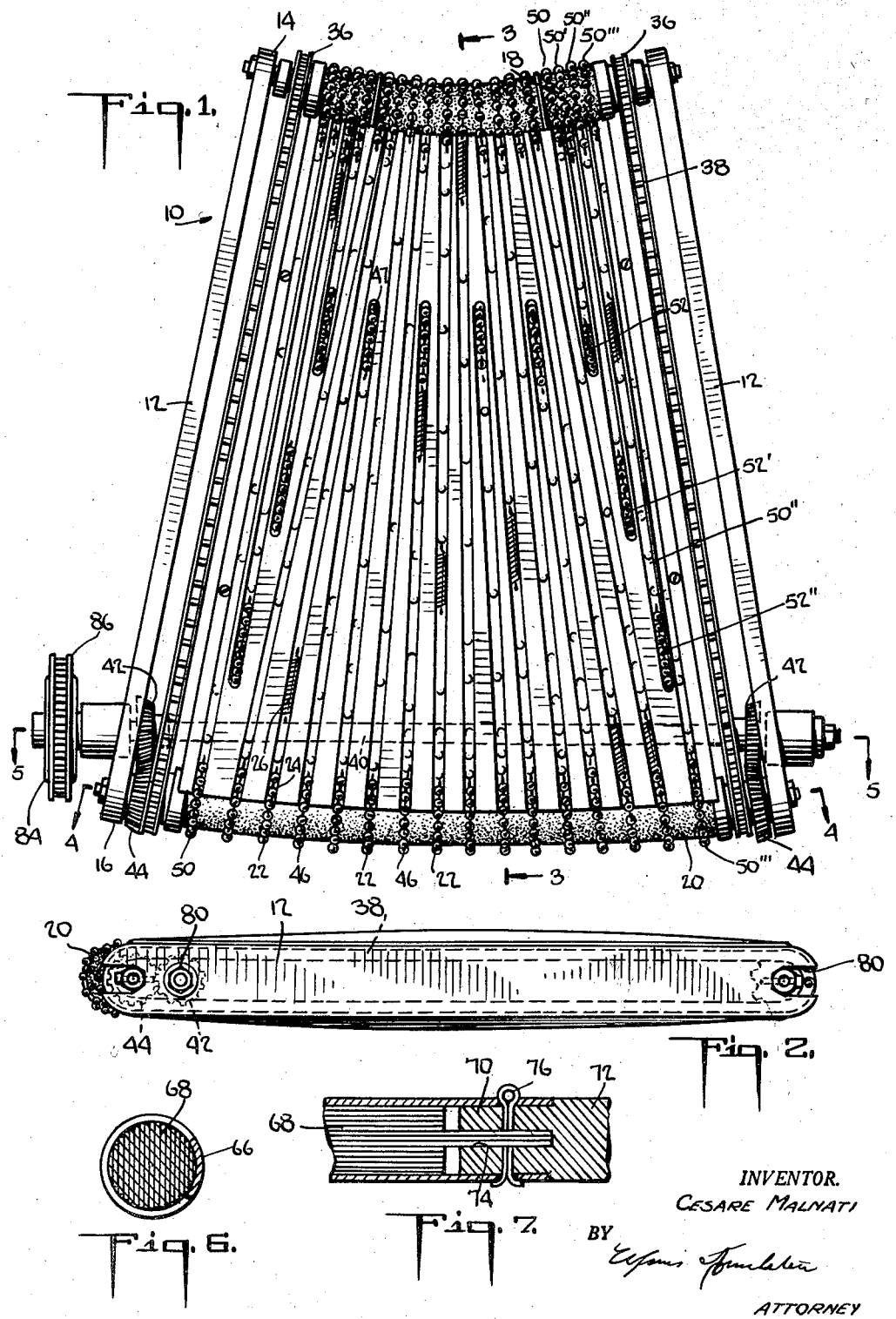

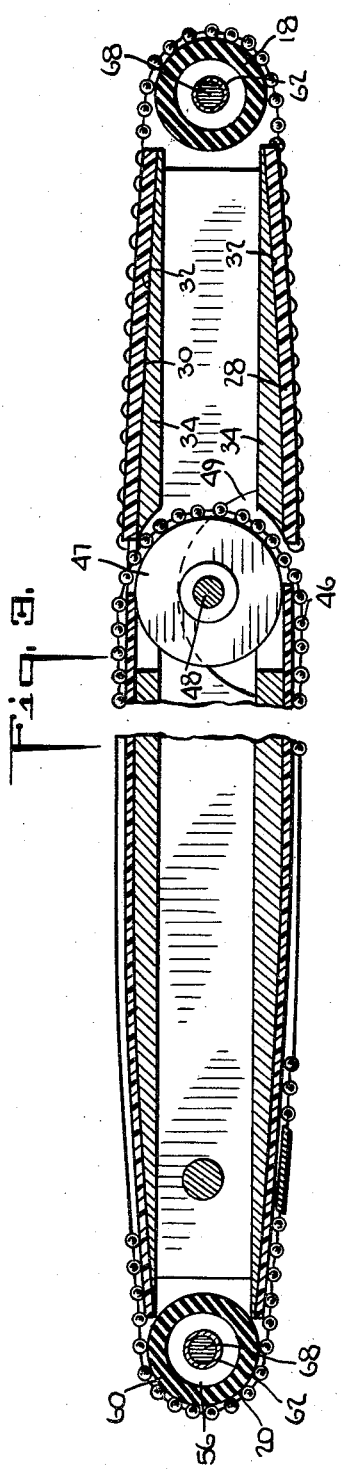

2,856,060

CONVEYOR OF TRANSVERSELY VARYING WIDTH

Cesare Malnati, Copiague, N. Y.

Application December 19, 1955, Serial No. 553,971

9 Claims. (Cl. 198—34)

This invention relates to a conveyor of transversely varying width.

In general, my invention is concerned with a conveyor which is particularly useful for transversely separating unbaked strips of breadstick dough as, for example, in a machine such as is shown and described in my United States Letters Patent No. 2,545,667 issued March 30, 1951, for Apparatus for Separating Closely Adjacent Strips of Dough. The invention, however, is not to be considered as limited to such use since it may be employed for separating or bringing together any articles or strips.

More specifically, my invention pertains to an improved conveyor of the general character described and claimed in my co-pending application for United States Letters Patent Serial No. 328,685 filed December 30, 1952, for Conveyor of Transversely Varying Width, now Patent No. 2,801,727.

The conveyor shown in my aforesaid co-pending application constitutes a pair of arcuate concentric rollers about which are trained a plurality of narrow endless belts that are in fanwise mutual relationship. Due to this arrangement, the degree of transverse separation of the dough strips is limited inasmuch as if the separation between the belts at a given point becomes too great the strips will fall between the belts. Moreover, in an attempt to increase the ratio of widths between the narrow and wide ends of the conveyor the dough strips have to be particularly crowded at the receiving, i. e., the narrow end and this creates difficulty in cutting the strips from a sheet.

It is an object of the present invention to provide a conveyor which overcomes all the aforementioned defects.

It is another object of my invention to provide a conveyor of the character described which increases at the delivery end of the conveyor the maximum permissible opening between the belts that originate at the receiving end of the conveyor.

It is another object of my invention to provide a conveyor of the character described which permits an increase in width of the receiving end of the conveyor without a multiplied corresponding increase in width at the delivery end of the conveyor and without reducing the spread obtained between articles moved by the conveyor.

It is another object of my invention to provide a conveyor of the character described which achieves all the foregoing results without unduly increasing the complexity of structure.

It is an ancillary object of my invention to provide for a conveyor of the character described a novel arcuate roller and shaft for the same.

Other objects of my invention in part will be obvious and in part will be pointed out hereinafter.

My invention accordingly consists in the features of construction, combinations of elements and arrangements of parts which will be exemplified in the conveyor hereinafter described and of which the scope of application will be indicated in the appended claims.

In the accompanying drawings in which is shown one of the various possible embodiments of my invention, Fig. 1 is a top view of a conveyor constructed in accordance with my present invention;

Fig. 2 is a side view thereof;

Figs. 3, 4 and 5 are enlarged fragmentary sectional views taken substantially along the lines 3—3, 4—4 and 5—5, respectively, of Fig. 1;

Fig. 6 is an enlarged sectional view taken substantially along the line 6—6 of Fig. 4; and Fig. 7 is an enlarged longitudinal sectional view of one of the curved shafts taken at the region where the shaft changes from slot to laminar form.

The invention will be described as it is used in a machine for separating strips of uncooked breadstick dough.

Pursuant to the instant invention, said machine includes a special conveyor belt which, as it progresses away from a zone at which narrow dough strips are deposited, has its width increased transversely of its general direction of travel by moving apart side-by-side narrow belts on which the strips are separated and translated and thereby separating the strips.

Referring now in detail to the drawings, the reference number 10 denotes a conveyor embodying my present invention. Said conveyor includes a frame constituting a pair of side beams 12 which diverge from a narrow receiving end 14 to a wide delivery end 16. A roller 18 spans the narrow end of the frame and another roller 20 the wide end. Both rollers are surfaced with a material, such as rubber, which is flexible and has good traction qualities. It is a necessary feature of the conveyor that both rollers have concentric curved longitudinal axes. The details of the roller constructions will be described hereinafter but it should be noted at this point that the particular structure of the variably curved axle constituting the center of each roller is one of the features of the present invention.

In accordance with the instant invention, the conveyor includes three different sets of narrow endless belts. One of these sets constitutes the belts 22 which are trained about the two rollers 18, 20 at the opposite ends of the conveyor. Because the rollers 18, 20 are concentric, these belts 22 are of the same length and are arranged in fanwise mutual relationship. A typical belt 22 comprises a few lengths 24 of ball chain joined by helical springs 26 which maintain the belts under a suitable tension. The number of belts shown is considerably less than the number used in a typical installation and the size of the balls shown is larger than those actually employed in order to facilitate illustration. Said belts are guided intermediate their ends by a lower plate 28 and an upper plate 30. These plates are provided with longitudinal grooves 32 in which the belts travel, said grooves being radially disposed with respect to the common center of the concentric longitudinal axes of the rollers, i. e., they diverge from each other in fanlike fashion in the direction of the wide end. The plates are supported, as by boards 34.

Each roller 18, 20 has a sprocket 36 secured on each end, chains 38 being trained about these sprockets so that a chain connects a sprocket on one side of the shorter roller 18 with a sprocket on the same side of the longer roller 20.

The longer roller 20 is suitably driven from a countershaft 40 by a pair of bevel gears 42 on said shaft meshing with bevel gears 44 on the longer roller.

The longitudinal axes of the rollers are concentrically curved to maintain the belts 22 of the first set in fanwise mutual relationship, that is to say, mutually angularly inclined. If the rollers were not thus arranged, the belts would tend to travel on the rollers and depart from the desired mutual relationship, all as is explained in my said co-pending application.

Specifically pursuant to my invention, I provide a second set of narrow endless belts 46, like the belts 22, which are trained about the longer roller 20 and also about a set of narrow sheaves 47. Said sheaves are located between the narrow and wide ends of the frame and are positioned between some of the belts 22 of the first set. One desirable arrangement is to have the sheaves 47 so located that there are two belts 22 of the first set between each pair of sheaves. The sheaves are suitably mounted for rotation as on axles 48 carried on bearings 49 supported on the lower board 34.

The axis of rotation of each sheave is substantially perpendicular to the planes of the belts 22 on opposite sides thereof and also lies in the planes of the longitudinal axes of the rollers 18, 22. Moreover, the sheaves are substantially midway between the adjacent belts 22. In addition, the sheaves are so oriented that their planes intersect at the common center of the concentric longitudinal axes of the rollers 18, 20.

The sheaves 47 are located at any suitable distance from the shorter roller 18, their location being determined by the number of belts 22 in the first set, by the number of sheaves 47, by the widths of the belts 22, 46, by the angle of divergence of the belts 22 and by the size of the articles being conveyed. Essentially, the belts 46 of the second set reduce the angle of divergence of the belts 22 of the first set so that without reducing the rate of lateral spread of the conveyor there is less spacing between adjacent belts 22, 46 on the roller 20, even though the spacing between the belts 22 might exceed the permissible spacing at the delivery end of the conveyor for the article being transported. In other words, the second set of belts functions as a secondary transverse expansion means.

The sheaves 47 are located close enough to the roller 18 to prevent any articles being conveyed from reaching a point where the spacing between the belts 22 exceeds the distance needed to properly transport the articles.

If in the construction illustrated the length of the roller 20 were greater and accordingly the angle of divergence of the belts 22 were increased, either the sheaves 47 could be located closer to the receiving roller 18 or additional sheaves would be employed and their location shifted closer to the delivery roller 20.

It wil be understood that the location of the sheaves 47 as described above is such that the belts 46 of the second set are located equidistantly between the belts 22 of the first set disposed on opposite sides thereof whereby not only is a pleasing and symmetrical pattern of belts presented but most effective use of the belts is secured.

The sheaves 47 are idlers, the belts 46 being driven entirely from the longer roller 20.

If desired, additional sheaves 47 can be included at different distances from the roller 18 to permit still greater spreading between the belts 22 of the first set, the controlling consideration being to permit as much divergence between the belts 22 as is necessary to secure any given separation of articles being conveyed and at the same time not to exceed on the roller 20 a predetermined maximum spacing between belts such that the articles being conveyed will drop between the belts.

From the foregoing, it will be appreciated that the number and position of the belts 46 of the second set is controlled by the particular conditions to be satisfied by any specific conveyor.

Further pursuant to the present invention, I provide a third set of endless belts 50. The function of this last set of belts is to increase the effective width of the conveyor at the edges of the receiving end, in other words, the length of the roller 18, without effecting a corresponding multiplied increase in width at the delivery end, i. e., of the roller 20 so that a slight variation in the transverse location of the dough sheet will not disturb the operation of the conveyor, without making the delivery end of the conveyor unduly wide. The third set of belts is so arranged that it will transport an article from the receiving end of the conveyor to a point on the delivery end of the conveyor immediately alongside the outermost belt 22 of the first, i. e. primary expansion, set. To effect this result, the third set of belts is arranged to constitute, in effect, a wedge-shaped conveyor, that is to say, a conveyor which is broad at its receiving end and narrow at its delivery end whereby to act as a transverse compression conveyor.

More specifically, the third set of belts are trained about the shorter receiving roller 18 and also about sheaves 52. The belts 50 are progressively longer from the outermost belt 22 of the primary expansion set to the side of the conveyor. Thus, the first belt 50 at one side of the conveyor which is closest to the outermost belt 22 is the shortest and its associated sheave 52 is closest to the roller 18. The next belt 50' is somewhat longer and its sheave 52' further from the roller 18. The third belt 50" is still longer and its sheave 52" closest to the roller 20. The last and outermost belt 50''' is trained about the rollers 18, 20. It thus will be seen that the four belts of the transverse compression set on each side of the conveyor constitute in effect a conveyor whose width is a maximum adjacent the receiving roller 18 and a minimum, i. e., one belt in width at the delivery roller 20. The number of belts of the last set as shown in the drawings is schematic and fewer than actually employed in a commercial conveyor. The third set of belts upon deposit of an article such as a dough strip thereon at the reception end of the conveyor will move this article toward the delivery end of the conveyor in a direction converging upon the outermost belt 22 of the first set whereby regardless of the point of deposit of the outermost article, its point of delivery remains constant.

Each of the sheaves 52 is suitably mounted for rotation in a manner similar to the sheaves 47. The sheaves 52 are idlers, the belts 50 of the third set being driven by the receiving roller 18.

Identical constructions are employed in both the rollers 18, 20 to secure curved longitudinal axes and hence I have shown in detail only the construction for the roller 20. Said roller (see Fig. 4) includes a fixed (non-rotatable) central shaft, i. e., axle 54 which has the longitudinal curvature desired for the roller. A plurality of needle bearings 56 separated by axial spacers 58 are carried by the shaft 54 so that, in effect, the needle bearings are arranged end-to-end, although it will be apparent that they are slightly angularly offset with respect to one another due to the curvature of the shaft 54. It is not necessary that the inner races of the needle bearings be tight on the shaft. It will suffice if the inner races simply do not wobble although it is preferred that these races fit the shaft snugly so that there will be a frictional restraint against their rotation relative to the shaft. Each needle bearing is associated with a successively different portion of the curved central shaft 54 so that, as noted above, each needle bearing is at a slight angle with respect to the adjacent bearings.

A rubber sleeve 60 is slipped over the bearings and is in frictional contact with the external surfaces of the outer races of the needle bearings so that the sleeve will turn with these races. Thus, successive portions of the sleeve turn about axes of rotation which are differently angularly inclined. Hence, the general effect is that the sleeve turns as a whole about a curved axis of rotation which is coincident with the curved longitudinal axis of the central shaft.

The particular structural details employed to provide any desired curvature to the central shaft is an ancillary feature of my present invention. Said shaft unlike the curved shaft shown in my said co-pending application, is not a solid piece of metal but rather constitutes several elements. More particularly, the shaft 54 includes a hollow sleeve 62 which is provided with similarly oriented transverse slots 64 at regular intervals along its length. Each of the slots extends around more than 180° of the circumference of the sleeve preferably being considerably longer and leaving, for example, only about 90° of a solid sector 66 (see Fig. 6) consisting of the original metal of the sleeve. This sector 66 is disposed on the concave side of the sleeve. It thus will be appreciated that although the hollow sleeve before slotting is a stiff member which cannot be easily bent and would be particularly difficult to bend without deformation, it now can be flexed with comparative ease along the side of the sleeve including the sectors 66. Preferably, the slots 64 are so located as to lie between adjacent needle bearings.

The provision of the slots 64 flexibilizes the sleeve 62 to too great an extent and renders the sleeve subject to deformation. Hence, I incorporate a resilient stiffening member which, although flexible, will supply the desirable additional rigidity to the sleeve. Said stiffening member constitutes a plurality of leaf springs 68 (see Fig. 6) arranged as juxtaposed laminae defining a substantially circular core that completely fills up the hollow interior of the sleeve. Inasmuch as the core constitutes separate thin resilient sheets, when the sleeve is flexed the sheets will slide upon one another to permit the bending action to take place and still support the sleeve whereby to maintain the original round contour.

The leaf springs terminate short of the ends of the sleeve to permit reception therein of a reduced diameter plug portion 70 of a cap 72 that terminates each end of the shaft 54. A through bore runs transversely through the sleeve and plug portion of the cap and also through a few of the central laminae that extend into a slot 74 in the plug. A cotter pin 76 passing through said bore has its tips spread in order to secure the cap to the shaft.

The caps are utilized to hold the shaft in place. For example, referring to Fig. 4, each cap has its outer end threaded to receive a hexagonal nut 78 that is located in a slot 80 at the end of the associated side beam 12 (see Fig. 2).

The leaf springs are maintained in any given relative relationship and thus the shaft is caused to hold any particular curvature in any suitable manner, as, for instance, by welding together the ends of the leaf springs after the roller has been bent to the required arcuate shape or, as shown, by drilling a bore through the sleeve, cap and springs and passing the cotter pin 76 therethrough.

Ferrules 78 secured to the ends of the rubber sleeves 60 also are fast to the sprockets 36 and gears 44.

The countershaft 40 is supported and driven in any suitable fashion. For example, the shaft is journalled in bearings 82 that are fixed to the beams 12. One end of the countershaft carries a sprocket 84 that is engaged by a chain 86 actuated by a suitable source of power (not shown) as, for example, a motor driven sprocket.

It should be observed that the belts of the second and third sets like those of the first set run in longitudinal grooves which aid in guiding the same. It will be apparent that all of the belts have portions thereof extending above the grooves in the upper plate 30 whereby to be available to support the objects being transported by the conveyor.

It thus will be seen that I have provided a conveyor which achieves all the objects of my invention and is well adapted to meet the conditions of practical use.

As various possible embodiments might be made of my above invention and as various changes might be made in the embodiment above set forth, it is to be understood that all matter herein described or shown in the accompanying drawings is to be interpreted as illustrative and not in a limiting sense.

Having thus described my invention, I claim as new and desire to secure above Letters Patent:

1. A conveyor for shifting objects laterally outwardly as they are translated forwardly, said conveyor including receiving and delivery arcuate concentric registered rollers, a first set of narrow endless primary transverse-expansion belts trained about said rollers in fanwise mutual relationship, sheaves located between some of said belts intermediate said rollers, said sheaves being arranged with their planes intersecting the common center of the concentric rollers, and a second set of narrow endless secondary transverse-expansion belts trained about said sheaves and the delivery rollers.

2. A conveyor for shifting objects laterally outwardly as they are translated forwardly, said conveyor including receiving and delivery arcuate concentric registered rollers, a set of narrow endless primary transverse-expansion belts trained about said rollers in fanwise mutual relationship, and a secondary transverse-expansion translating means filling the spaces between the primary transverse-expansion belts from adjacent the delivery end of the conveyor to intermediate the receiving and delivery rollers.

3. A conveyor for shifting objects laterally outwardly as they are translated forwardly, said conveyor including receiving and delivery arcuate concentric registered rollers, a set of narrow endless transverse-expansion belts trained about said rollers in fanwise mutual relationship, and a wedge-shaped set of belts alongside one side of the first set of belts, the broad end of said wedge-shaped set of belts being at the receiving roller and the narrow end at the delivery roller.

4. A conveyor for shifting objects laterally outwardly as they are translated forwardly, said conveyor including receiving and delivery arcuate concentric registered rollers, a first set of narrow endless transverse-expansion belts trained about said rollers in fanwise mutual relationship, a second set of narrow endless transverse-compression belts trained about the receiving roller, said belts being of progressively different lengths, the longest of said compression belts being trained about the delivery roller and a set of sheaves about which the remainder of the compression belts are trained, all of said compression belts being substantially parallel to each other, the longest of said compression belts lying alongside an outermost expansion belt at the delivery roller.

5. A conveyor for shifting objects laterally outwardly as they are translated forwardly, said conveyor including receiving and delivery arcuate concentric registered rollers, a first set of narrow endless primary transverse-expansion belts trained about said rollers in fanwise mutual relationship, sheaves located between some of said belts intermediate said rollers, said sheaves being arranged with their planes intersecting the common center of the concentric rollers, a second set of narrow endless secondary transverse-expansion belts trained about said sheaves and the delivery rollers and a transverse-compression translating means alongside an outermost expansion belt.

6. A conveyor for shifting objects laterally outwardly as they are translated forwardly, said conveyor including receiving and delivery arcuate concentric registered rollers, a first set of narrow endless primary transverse-expansion belts trained about said rollers in fanwise mutual relationship, sheaves located between some of said belts intermediate said rollers, said sheaves being arranged with their planes intersecting the common center of the concentric rollers, a second set of narrow endless secondary transverse-expansion belts trained about said sheaves and the delivery rollers and transverse-compression translating means alongside both outermost expansion belts.

7. A conveyor for shifting objects laterally outwardly as they are translated forwardly, said conveyor including receiving and delivery arcuate concentric registered rollers, a first set of narrow endless primary-transverse expansion belts trained about said rollers in fanwise mutual relationship, sheaves located between some of said belts intermediate said rollers, said sheaves being arranged with their planes intersecting the common center of the concentric rollers, a second set of narrow endless secondary transverse-expansion belts trained about said sheaves and the delivery rollers and a wedge-shaped compression translating means having its wide end at the receiving roller and its narrow end at the delivery roller, said means being disposed adjacent an outermost expansion belt.

8. A conveyor for shifting objects laterally outwardly as they are translated forwardly, said conveyor including receiving and delivery arcuate concentric registered rollers, a first set of narrow endless primary transverse-expansion belts trained about said rollers in fanwise mutual relationship, a second set of narrow endless transverse-compression belts trained about the receiving roller, and last-named belts being located alongside an outermost expansion belt and being of progressively greater length in a direction away from said outermost expansion belt, the outermost of the compression belts being trained about the delivery roller, and sheaths intermediate the two rollers about which the remainder of the compression belts are trained, said compression belts being substantially parallel to one another, the outermost compression belt being located adjacent the outermost expansion belt at the delivery roller.

9. A conveyor for shifting objects laterally outwardly as they are translated forwardly, said conveyor including receiving and delivery arcuate concentric registered rollers, a first set of narrow endless primary transverse-expansion belts trained about said rollers in fanwise mutual relationship, sheaves located between some of said belts intermediate said valves, said sheaves being arranged with their planes intersecting the common center of the concentric rollers, a second set of narrow endless secondary transverse-expansion belts trained about said sheaves and the delivery rollers, a third set of narrow endless transverse-compression belts trained about the receiving rollers, said last-named belts being located alongside an outermost expansion belt and being of progressively greater length in a direction away from said outermost expansion belt, the outermost of the compression belts being trained about the delivery roller, and sheaths intermediate the two rollers about which the remainder of the compression belts are trained, said compression belts being substantially parallel to one another, the outermost compression belt being located adjacent the outermost expansion belt at the delivery roller.

References Cited in the file of this patent

UNITED STATES PATENTS

| | | |
|---|---|---|
| 1,814,652 | Weiss | July 14, 1931 |
| 1,868,538 | McKee | July 26, 1932 |
| 1,938,110 | Neutelings | Dec. 5, 1933 |
| 2,547,975 | Robertson | Apr. 10, 1951 |
| 2,594,591 | Runton | Apr. 29, 1952 |
| 2,619,703 | Dungler | Dec. 2, 1952 |

FOREIGN PATENTS

| | | |
|---|---|---|
| 13,017 | Great Britain | June 2, 1910 |
| 525,995 | Germany | June 1, 1931 |